(12) United States Patent
Butterworth

(10) Patent No.: US 6,589,139 B1
(45) Date of Patent: Jul. 8, 2003

(54) EXERCISE AND REHABILITATION EQUIPMENT

(76) Inventor: Paul John Butterworth, 1 Bampton Avenue, Chard, Somerset TA20 1DS (GB)

( * ) Notice: Subject to any disclaimer, the term of this patent is extended or adjusted under 35 U.S.C. 154(b) by 0 days.

(21) Appl. No.: 09/519,707

(22) Filed: Mar. 7, 2000

(30) Foreign Application Priority Data

Mar. 9, 1999 (GB) .............................. 9905260

(51) Int. Cl.[7] .............................................. A63B 69/16
(52) U.S. Cl. ...................... 482/57; 74/594.1; 74/594.3; 74/594.7
(58) Field of Search .................. 482/57; 403/104; 74/594.1, 594.3, 594.4, 594.7, 595, 600

(56) References Cited

U.S. PATENT DOCUMENTS 3,888,136 A * 6/1975 Lapeyre ..................... 74/594.1
4,606,241 A * 8/1986 Fredriksson ............... 74/594.1
4,915,374 A * 4/1990 Watkins ....................... 482/57
5,338,272 A * 8/1994 Sweeney, III ............... 482/57
5,566,589 A * 10/1996 Buck ......................... 74/594.1

FOREIGN PATENT DOCUMENTS

| BE | 374 378 | 11/1930 |
| DE | 95019 | 1/1897 |
| DE | 85 19 150 | 10/1985 |

* cited by examiner

Primary Examiner—Nicholas D. Lucchesi
Assistant Examiner—Tam Nguyen
(74) Attorney, Agent, or Firm—Melvin I. Stoltz

(57) ABSTRACT

A cycle (or an adaptation for a cycle) comprises a primary crank arranged for rotation about a first axis, a secondary crank, and connection means for selective connection of the secondary crank to the primary crank at a selected one of a plurality of positions on both the primary crank and the secondary crank. A pedal is mounted on the secondary crank, and selectively operable means is provided for either permitting or preventing rotation of the secondary crank relative to the primary crank, in dependence of the nature of the disabilities or injuries of the user of the cycle.

2 Claims, 7 Drawing Sheets

EXERCISE AND REHABILITATION EQUIPMENT

FIELD OF THE INVENTION

This invention relates to exercise and rehabilitation equipment and has for its object the provision of improved equipment which enables people with lower limb disabilities to use cycling as a form of exercise or rehabilitation.

In U.S. Pat. No. 4,915,374 there is described an exercise cycle which includes a frame, a shaft rotatably mounted on the frame, a primary crank at each end of the shaft and a secondary crank pivotally connected to each primary crank. A pedal is pivotally connected to a selected location along each secondary crank.

The exercise cycle described in said US specification can accommodate limited ranges of movement of both legs but it is a specific object of the present invention to provide a cycle (or an adaptation for a cycle) which provides for a wider range of adjustability than the exercise cycle described in U.S. Pat. No. 4,915,374.

SUMMARY OF THE INVENTION

According to the present invention there is provided a cycle (or an adaptation for a cycle) comprising a primary crank arranged for rotation about a first axis, a secondary crank, connection means for selective connection of the secondary crank to the primary crank at a selected one of a plurality of positions on both the primary crank and the secondary crank, a pedal mounted on the secondary crank, and selectively operable means for either permitting or preventing rotation of the secondary crank relative to the primary crank.

Other features of the invention are defined in the subsidiary claims presented herewith.

DESCRIPTION OF THE PREFERRED EMBODIMENTS

FIGS. 1 to 6 show an assembly designed to fit cycles, cycle ergometers and exercise bikes. The system provides for incremental adjustment and opposing orientation of two cycle cranks in a fixed or swinging mode, allowing for varying degrees of strength, movement or flex in an affected limb, exercising actively or dynamically, and isolating the effect of the non-affected limb.

Figure 1:
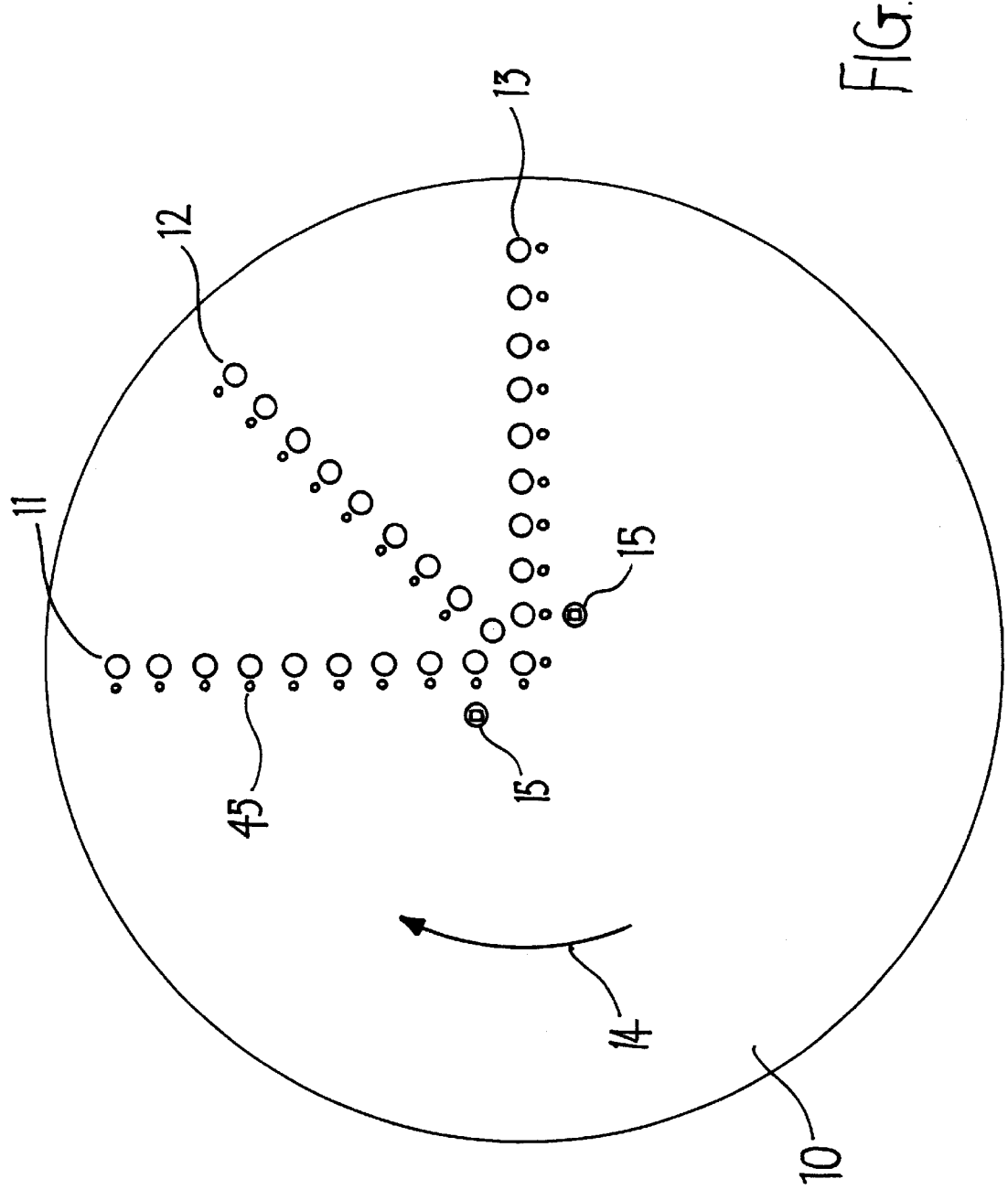
FIG. 1 shows a first primary crank.

FIG. 1 shows a first primary replacement crank 10 for a cycle ergometer. The crank 10 is in the form of a circular plate formed with three radially extending series of equally spaced fixing holes 11, 12 and 13. In operation, the primary crank 10 is intended to rotate in the direction indicated by the arrow 14. Crank 10 is also formed with two mounting holes 15 equally spaced from the centre of the circular plate forming the crank 10.

Figure 2:
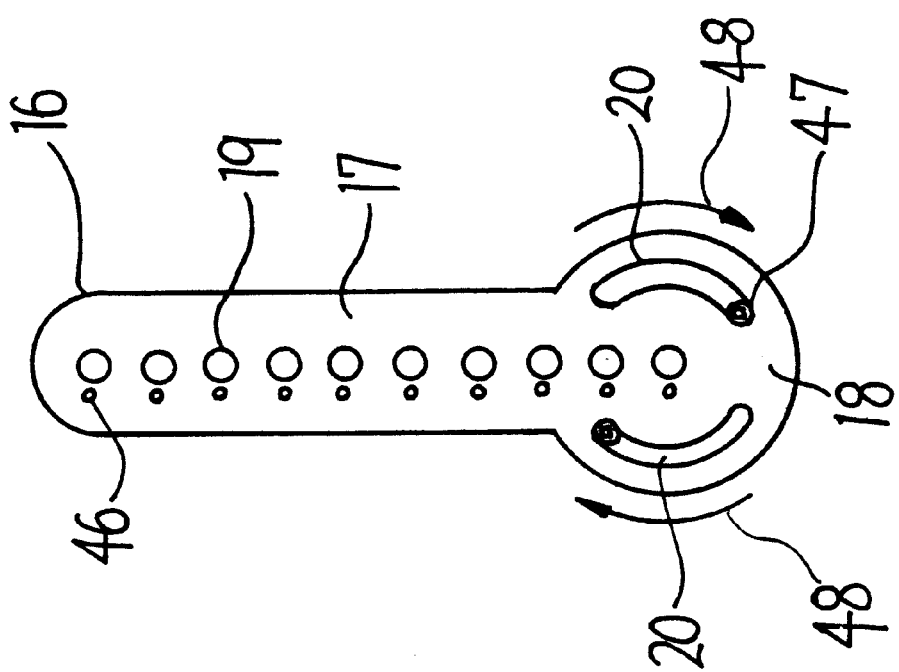
FIG. 2 shows a second primary crank.

FIG. 2 shows a second primary replacement crank 16 which is in the form of an elongated plate 17 at one end of which there is a circular portion 18. The elongated plate 17 is formed with an axially extending row of equally spaced fixing holes 19 arranged at the same spacing as the fixing holes 11, 12 and 13. The circular portion 18 is formed with a pair of arcuate slots 20 which are spaced from the centre of the circular portion by a distance equal to the spacing of the mounting holes 15 from the centre of the circular plate forming the crank 10.

Figure 3:
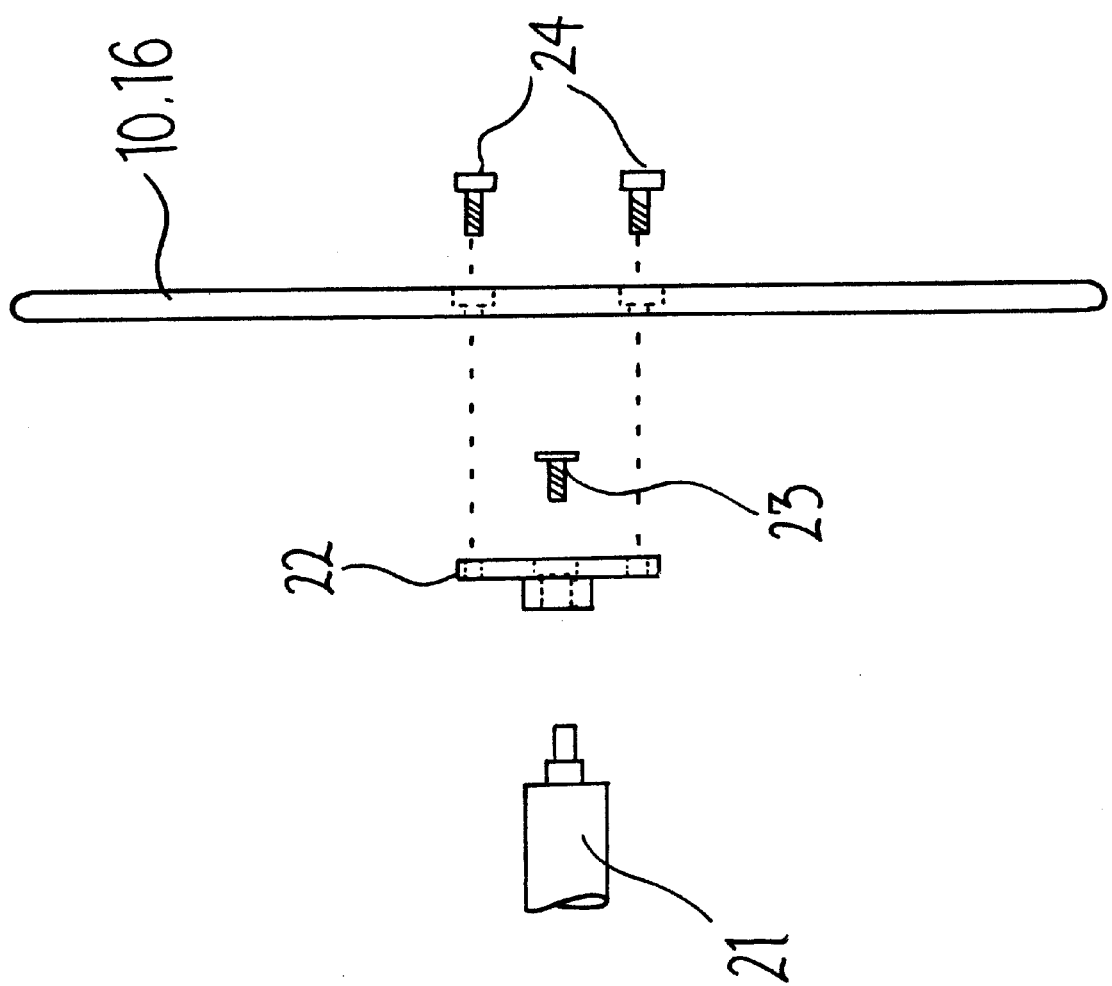
FIG. 3 shows the method of attachment of either of the primary cranks to an axle.

FIG. 3 shows one end of an axle 21 as commonly used on a bicycle or on a cycle ergometer. A mounting plate 22 is attached to the axle 21 by means of a bolt 23. Either primary crank 10, 16 can then be attached to the mounting plate 22 by means of bolts 24 which pass through either the mounting holes 15 of crank 10 or the arcuate slots 20 of crank 16.

A second crank mechanism will be mounted on the other end of the axle 21 for engagement by the other foot of the user. In particular, the system herein described can be repeated on the other end of the axle 21.

Figure 6:
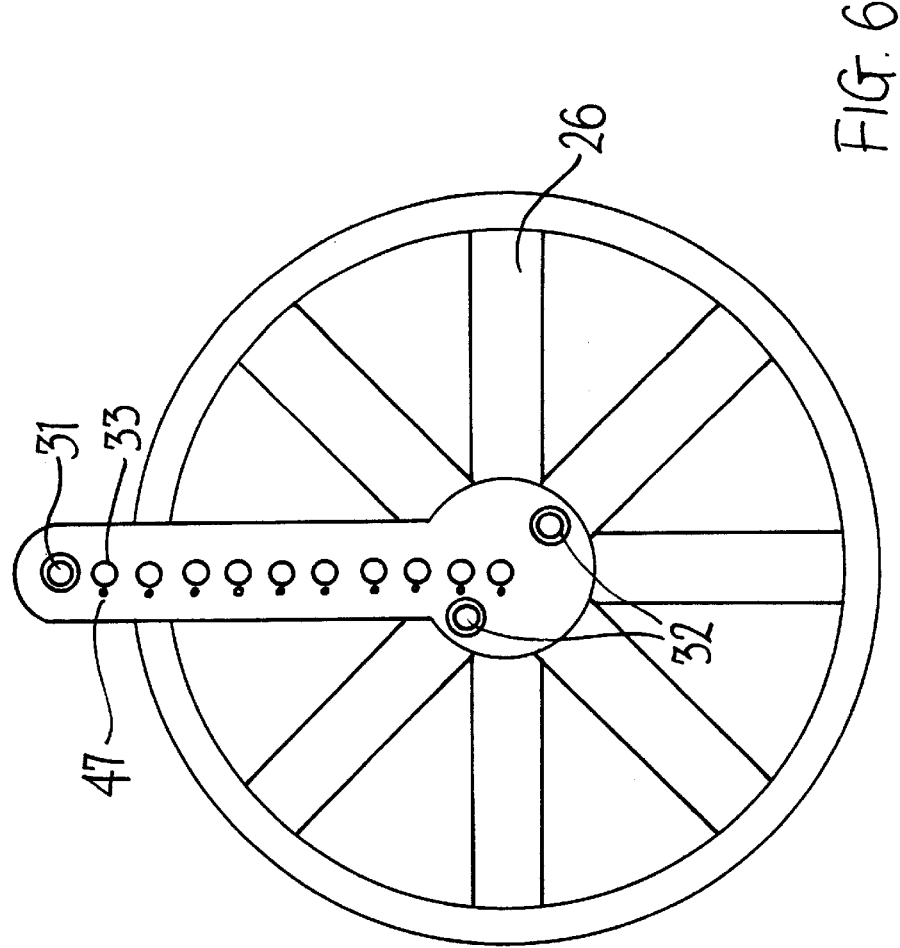
FIG. 6 is a front view of the adaptation shown in FIG. 5.
Figure 5:
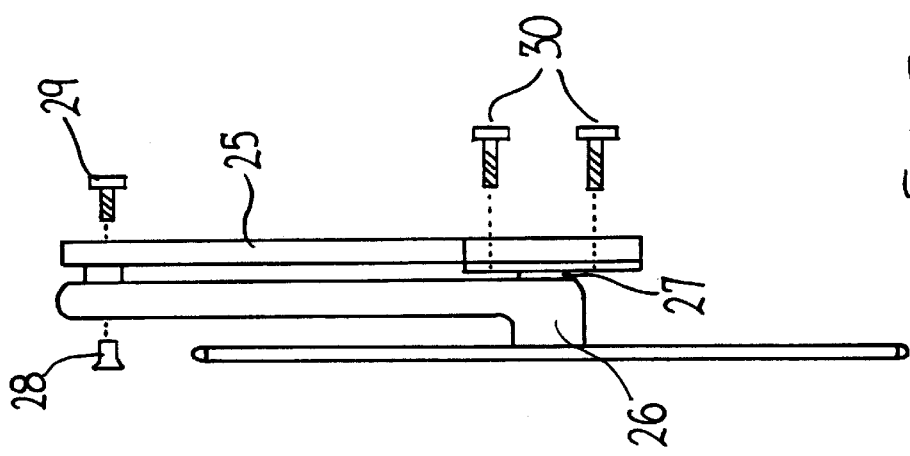
FIG. 5 is a side view of a bicycle adaptation.

FIGS. 5 and 6 show a bicycle or exercise bicycle adaptation in which a primary crank 25 is attached to the outside of a commonly used bicycle crank 26. An adaptor plate 27 replaces the existing centre bolt of the bicycle and a stud 28 replaces the existing cycle pedal. The primary crank 25 is attached to the bicycle crank 26 and to the adaptor plate 27 by means of bolts 29 and 30 which pass through holes 31 and 32 in the primary crank 25. A row of equally spaced fixing holes 33 is formed in the primary crank 25.

The bicycle crank 26 will be arranged for rotation about the axis of an axle (not shown) at the other end of which there will be either a conventional pedal and crank drive system or a primary/secondary crank assembly in accordance with the present invention, depending on the requirements and disabilities of the user.

Figure 4:
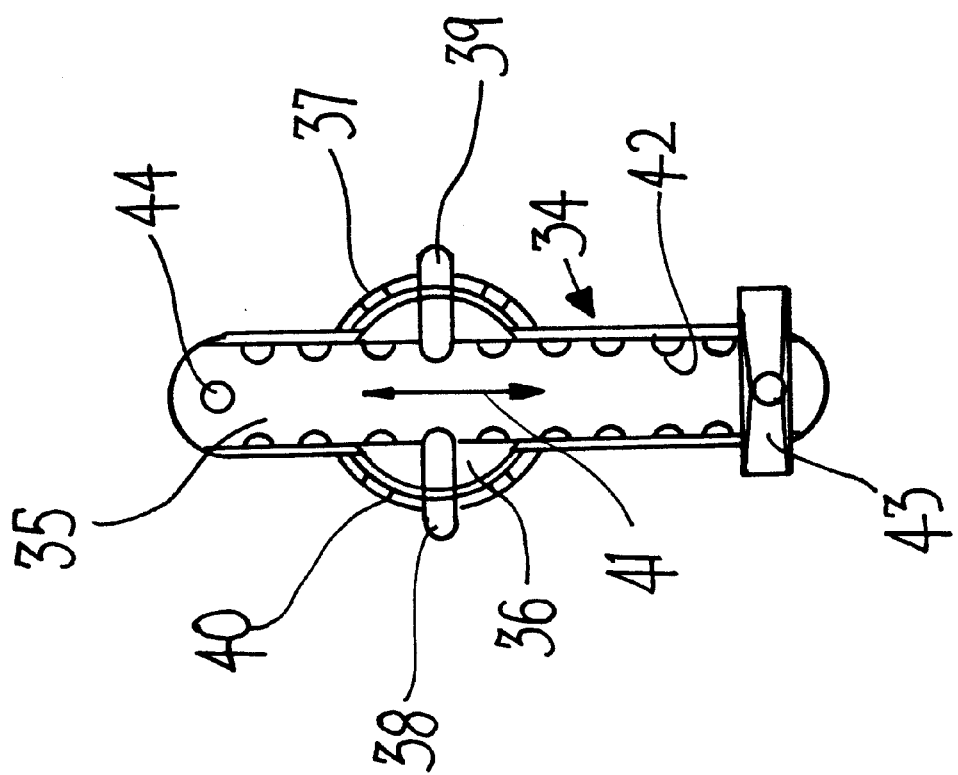
FIG. 4 shows a secondary crank assembly.

A secondary crank assembly 34 is shown in FIG. 4 and comprises a crank arm 35, a crank arm housing 36 formed with recesses 37, a pair of locking clips 38 and 39, and a journal 40. The crank arm 35 is located in the housing 36 by means of a T-slot arrangement (not shown).

Three different modes of operation of the apparatus can be obtained by use of the components and assemblies shown in FIGS. 1 to 6. These modes of operation are as follows:
a) a) the swinging mode,
b) the fixed mode, and
c) the advance mode.

In the swinging mode, the secondary crank assembly 34 is attached to one of the primary cranks 10, 16, 25 via fixing holes 11 (FIG. 1), fixing holes 19 (FIG. 2) or fixing holes 33 (FIG. 6). Locking clips 38 and 39 are depressed so as to locate in recesses 37 and to fix the crank arm housing 36 to the journal 40. This allows the secondary crank assembly 34 to be fixed by either a clockwise or an anti-clockwise rotation into fixing holes 11 (FIG. 1), fixing holes 19 (FIG. 2) or fixing holes 33 (FIG. 6).

Locking clips 38 and 39 are then pulled out to their furthest extent to allow adjustment of the crank arm 35 in the direction of the arrow 41 in FIG. 4. Notches 42 are provided along both sides of the crank arm 35 and are at equal spacings at a pitch which is the same as the pitch of the fixing holes 11 (FIG. 1), fixing holes 19 (FIG. 2) and fixing holes 33 (FIG. 6). Once the crank arm 35 has been fixed at the desired length, locking clips 38 and 39 are depressed so as to locate in the notches 42.

In the swinging mode, the crank arm housing 36 rotates freely about journal 40. A pedal 42 at the lower end of the crank arm 35 follows a circular path which has its centre at the centre line of the journal 36. The swinging mode allows full extension of a limb while producing incremented anomalies of flexion.

In a first fixed mode, the secondary crank assembly is attached to a primary crank 10, 16 or 25 as described above and a fixed setting pin (not shown) is passed through a hole 44 and inserted in an appropriate fixing hole 11 (FIG. 1) or 19 (FIG. 2) or 33 (FIG. 6) along the same row of holes as that to which the secondary crank assembly 34 is attached.

In a second fixed mode, the secondary crank assembly 34 is attached to a primary crank 10, 16 or 25 as described above and locking clip 38 is replaced by an indexable plunger pin (not shown). When depressed, the plunger pin engages with a selected one of a series of holes 45 in primary crank 10, or holes 46 in primary crank 16 or holes 47 in primary crank 25.

With the equipment in either the first fixed mode or the second fixed mode, the pedal 43 follows a circular path having a fixed radius about the axis of axle 21. This allows for anomalies of fixed flexion deformity of a limb to a range of flexion.

The advance mode provides passive or dynamic exercise using the primary crank 10. The secondary crank assembly 34 is attached to the primary crank 10 as described above, except that the secondary crank assembly 34 is attached to a selected one of the fixing holes 12 and 13 (instead of to the fixing holes 11) in an advanced position. This provides passive movement on the side advanced and dynamic movement of the opposite side, in varying degrees, in either a fixed or swinging mode. In the fixed mode, the longitudinal axis of the secondary crank assembly 34 extends parallel to the row of holes 11 in the primary crank 10 whereas, in the advance mode, the longitudinal axis of the secondary crank assembly 34 extends at an inclination to the row of holes 11.

The primary crank 16 shown in FIG. 2 includes a series of fixing holes 19 to which, as described above, the secondary crank assembly 34 can be attached in an advance crank position. Bolts 47 engaged in arcuate slots 20 can be released to allow the primary crank 16 to be advanced in the direction of the arrows 48. A series of locations (not shown) are provided in the bottoms of the counter-bored slots 20 to give a positive location. Once the desired advance position has been reached, the bolts are re-tightened. This arrangement provides passive movement on the side which has been advanced and dynamic movement on the opposite side in varying degrees in a fixed or swinging mode.

Figure 8:
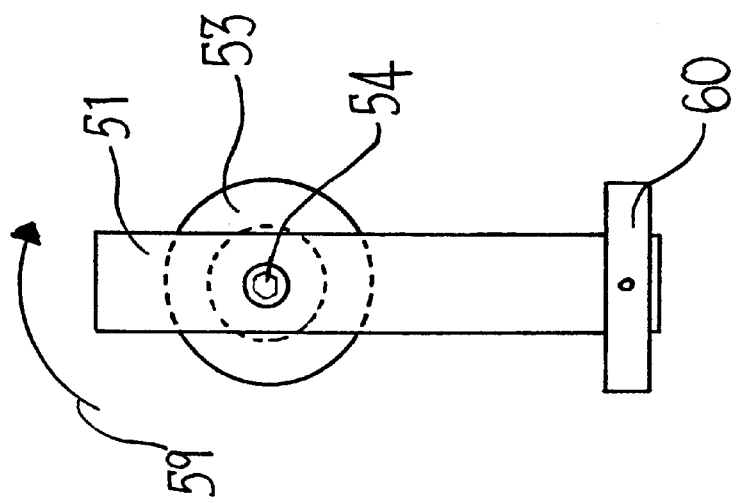
FIG. 8 is a side view of the secondary crank of the device shown in FIG. 7.
Figure 7:
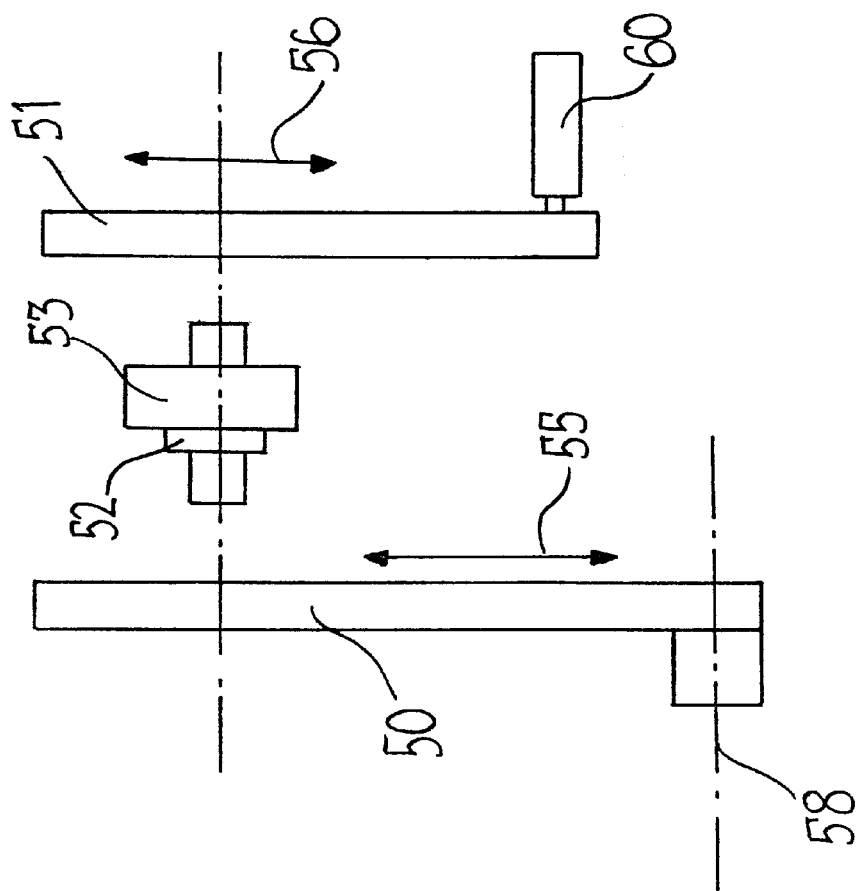
FIG. 7 is an exploded view of a further device which has been designed to enable people with lower limb disabilities or injuries to use cycling as a form of exercise or rehabilitation.

Turning next to FIGS. 7 and 8, these show a design which provides for anomalies in lower limb joint motion or muscle strength in a unilateral or bilateral mode.

The device shown in FIGS. 7 and 8 includes a primary crank 50, which may be the crank arm of a bicycle or exercise bike, and a secondary crank 51. The primary crank 50 is mounted on the bicycle or exercise bike and has a fixed axis of rotation 58. The secondary crank 51 is connected to the primary crank by means of a linked shaft 52 and housing 53. The shaft 52 and housing 53 are arranged to rotate independently of each other, except when an Allen key is inserted through a hexagonal hole 54 extending along the axis of the shaft 52 and tightened. The assembly comprising the linked shaft 52 and housing 53 is fixed into primary crank 50 using a threaded fixing such that the assembly 52, 53 is movable relative to the primary crank 50 in the direction of its longitudinal axis 55. Secondary crank arm 51 is then attached in a similar manner, i.e. using a threaded fixing such that the secondary crank arm 51 is movable relative to the assembly 52, 53 in the direction of the longitudinal axis 56.

The pedal 60 is mounted on the secondary crank 51 at a fixed point along the longitudinal axis of the secondary crank 51 whereas the connection of the secondary crank 51 to the primary crank 50, i.e. the axis of the hexagonal hole 54, is at a position which is adjustable along the axes of both cranks 50 and 51, thereby providing a large range of adjustment possibilities and ensuring that the physiotherapist or sports therapist can set the equipment depending on the requirements of the user. As an alternative to having a threaded fixing to provide for movement of the assembly 52, 53 in the direction of the longitudinal axis of the second crank 51, the secondary crank 51 may be provided with a row of spaced holes, in any one of which the assembly 52, 53 can be inserted.

In operation, with the linked shaft 52 and housing 53 free to rotate independently of each other, the primary crank 50 will rotate about its axis of rotation 58 in the direction of the arrow 59 in FIG. 8 and the secondary crank 51 will pivot relative to the primary crank 50 such that a pedal 60 mounted at the lower end of the secondary crank will follow a circular path with the longitudinal axis 56 of the secondary crank 51 remaining vertical.

When the shaft 52 and housing 53 are fixed against movement relative to one another, the primary crank 50 and the secondary crank 51 will rotate together about the axis 58 and the pedal 60 will travel along a circular path whose radius can be varied as required by adjusting the position of the shaft and housing 52, 53 relative to the primary crank 50 in the direction of the arrow 55, and/or by adjusting the position of the shaft and housing 52, 53 relative to the secondary crank 51 in the direction of the arrow 56. The secondary crank 51 can be fixed against movement relative to the primary crank 50 either with the longitudinal axes of the two cranks 50 and 51 parallel to one another or at an acute angle to one another.

The primary crank 50 and the secondary crank 51 will normally form part of a cycle or exercise cycle which includes a second assembly 50, 51 arranged for rotation about the axis 58. The assembly shown in FIGS. 7 and 8 and the second assembly 50, 51 will be adjustable individually so that, when a user is carrying out an exercise or rehabilitation program, the settings of each assembly, in the swinging, fixed or advance mode, will be adjusted by the physiotherapist or sports therapist depending on the requirements of the user.

Figure 9:
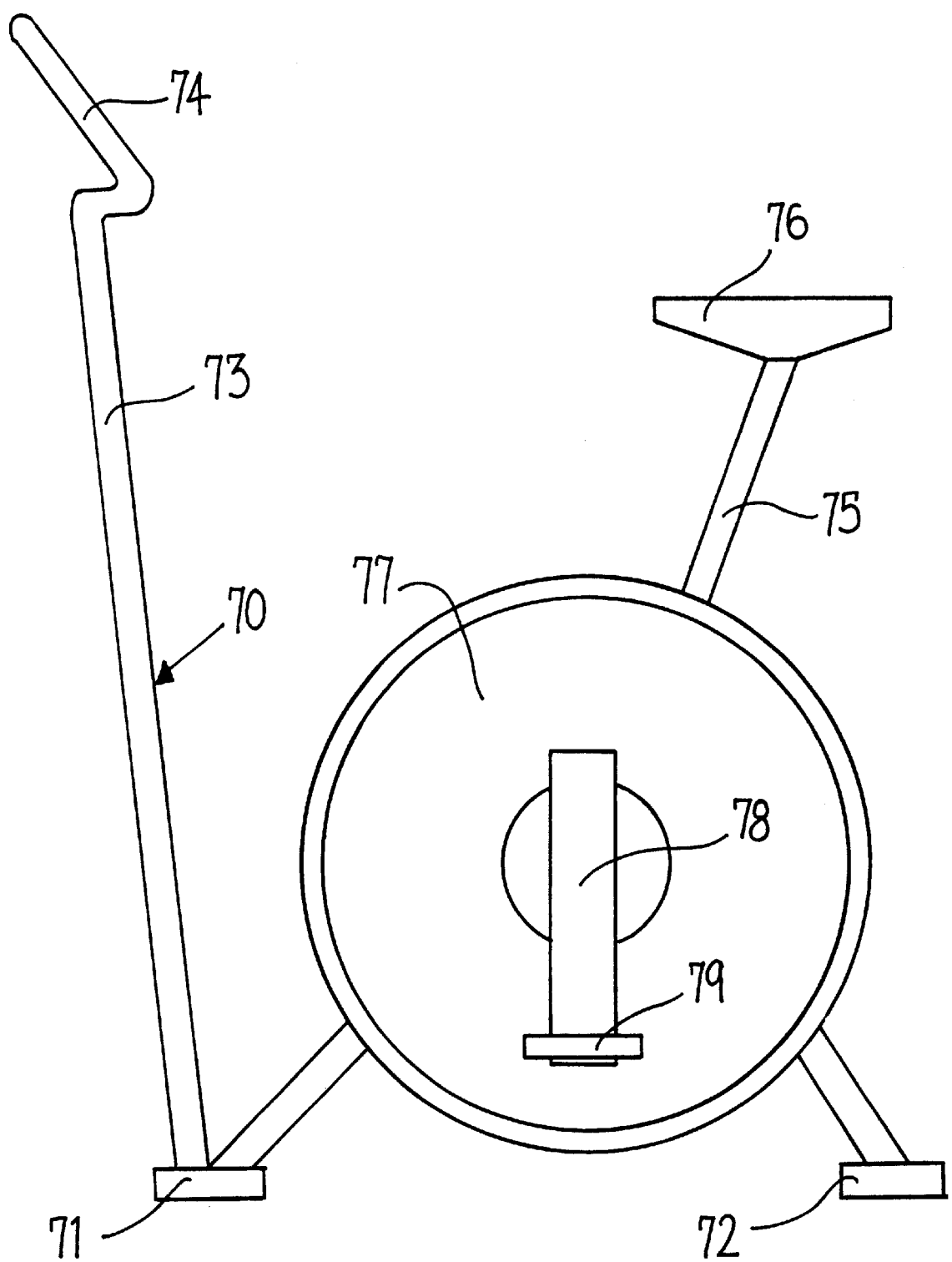
FIG. 9 is a diagrammatic side view of an exercise cycle incorporating the features of the present invention.

Turning next to FIG. 9, this shows rehabilitation equipment in the form of an exercise cycle for use under the supervision of a physiotherapist or sports therapist. The equipment comprises a stand 70 including ground-engaging feet 71 and 72, an upright member 73 provided with hand-grips 74, an adjustable stem 75 on which a seat 76 is mounted, a pair of primary cranks 77 arranged for rotation about a common horizontal axis and a pair of secondary cranks 78, one mounted on each primary crank 77. The two primary cranks 77 are connected to an axle (not shown) in a manner similar to that shown in FIG. 3 and a pedal 79 is mounted on the secondary crank 78.

Each primary crank 77 may correspond to that shown in FIG. 1, i.e. it will have three radial rows of fixing holes, corresponding to the rows of holes 11, 12 and 13. Each secondary crank 78 may correspond to that shown in FIG. 4 or that shown in FIG. 8, i.e. it will either be arranged for connection to the primary crank 77 at a plurality of positions spaced axially of the secondary crank 78, or the point of connection of the secondary crank 78 to the primary crank 77 will be movable axially of the secondary crank.

The primary/secondary crank assemblies 77, 78 will be independently adjustable and capable of being set in their swinging, fixed and advance modes as described above.

As shown in FIG. 9, the pedal 79 is contained within the circumference of the primary crank 77 and the range of relative positions into which the primary crank 77 and the secondary crank 78 can be set will be such that this relationship will be maintained, i.e. the pedal will not project beyond the perimeter of the primary crank 77. No additional ground clearance is accordingly required as compared to a conventional exercise bike. This is in contrast with the arrangement shown in U.S. Pat. No. 4,915,374, which is in the form of a recumbent exercise cycle to provide the required ground clearance.

The apparatus of the present invention thus enable a very wide range of exercises to be provided, tailored to the needs of the user, either in the form of an adaptation for an existing cycle or exercise cycle or in the form of a purpose-built item of equipment.

What is claimed is:

1. A crank assembly comprising:
  A. a primary crank formed with a row of holes and arranged for rotation about a predetermined axis of rotation;
  B. a secondary crank formed with a row of holes;
  C. connection means engageable with a selectable one of each row of holes for selective connection of the secondary crank to the primary crank at a selected one of a plurality of positions on at least one of said cranks,
  D. a pedal mounted on the secondary crank;
  E. means for preventing rotation of the secondary crank relative to the primary crank so that when, in use, a user then applies pressure to the pedal, the primary and secondary cranks rotate in unison about said predetermined axis of rotation, and
  F. means for permitting rotation of the secondary crank relative to the primary crank so that when, in use, a user then applies pressure to the pedal, the primary crank will rotate about said predetermined axis of rotation and the secondary crank will pivot relative to the primary crank.

2. A crank assembly as claimed in claim 1, in which the pedal is mounted on the secondary crank at a fixed position along the length of the secondary crank and in which the connection means interconnecting the secondary crank and the primary crank is adjustable along the length of both the primary and secondary cranks.

* * * * *